May 19, 1925.
W. R. BULLARD
1,538,382
APPARATUS FOR MEASURING CURRENTS IN ELECTRICAL CABLE SYSTEMS
Filed Nov. 25, 1922
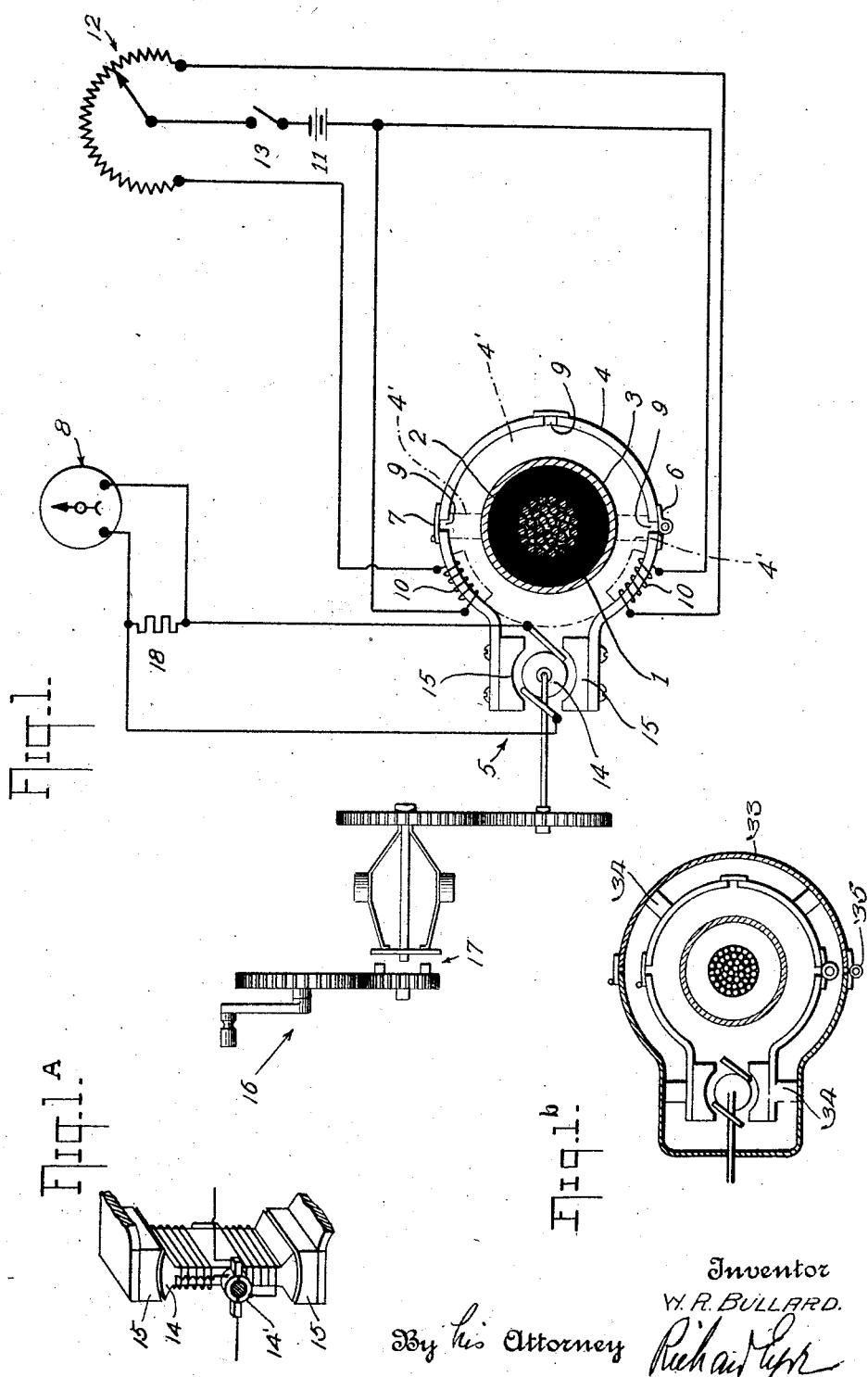
Inventor
W. R. BULLARD.
By his Attorney

Patented May 19, 1925.

1,538,382

UNITED STATES PATENT OFFICE.

WILLIAM RALPH BULLARD, OF NEW YORK, N. Y.

APPARATUS FOR MEASURING CURRENTS IN ELECTRICAL CABLE SYSTEMS.

Application filed November 25, 1922. Serial No. 603,318.

*To all whom it may concern:*

Be it known that I, WILLIAM RALPH BULLARD, a citizen of the United States of America, residing in the county of Bronx, city and State of New York, have invented an Apparatus for Measuring Currents in Electrical Cable Systems, of which the following is a specification.

This application relates generally to a novel method, system and apparatus for detecting and measuring currents flowing in the cables of an electrical transmission or distribution system, certain features whereof are particularly useful in the location of faults in the cables, while certain other features thereof are more especially adapted to the measurement of the volume of the current flowing.

The object of the invention as applied to the measurement of the current flowing is a novel apparatus, certain parts of which may be readily operatively associated with a cable to effect an accurate measurement of the direct current flowing therein without impairing the insulation of the cable or breaking the continuity of the circuit.

My divisional application Serial Number 674,624, filed November 14, 1923, is directed to that part of my invention more particularly relating to the testing of cable systems and for locating faults.

For a better understanding of the principle of my invention and the best mode or modes in which I contemplate applying the same reference may be had to the accompanying drawings wherein—

Fig. 1 is a diagrammatic view illustrating the application of certain features of my invention to the measurement of the volume of current flowing in a conductor, Fig. 1ª is a detail view of one element of the combination, and Fig. 1ᵇ is a sectional view through the aforesaid element and an enclosing magnetic shield.

Referring to Fig. 1, my system or apparatus includes a generator 5 which is adapted to be connected to a detecting or measuring device 8 and whose field poles are excited by the magnetism set up by the current flowing in a conductor 1, the construction and arrangement being such, as hereinafter set forth, that when the generator 5 is mechanically operated or rotated the current or E. M. F. generated and indicated by the instrument 8 is substantially proportional to the volume of current flowing in the conductor 1. 1 represents a single conductor cable (which carries the direct current to be measured) of which 2 is the insulation and 3 is a lead sheath which may or may not be present, 4 is a ring or magnetic circuit of soft iron which forms the field of the generator 5. 4 is in two parts, these parts being joined by a hinge at 6 and provided with a catch or clasp at 7. The object of this construction is to permit encircling the cable, 1, with the field 4 without breaking the continuity of the cable. The generator 5 may be designed to furnish either alternating or rectified current at its terminals, preferably the latter. This current is carried by small conductors to the measuring instrument 8 which may be of the moving coil galvanometer type in case rectified current is furnished at the terminals of the generator 5. The magnetic field 4 is broken at the points 9 by air gaps or gaps of nonmagnetic material for a purpose hereinafter described. The coils 10 are in magnetic relationship with the field 4 and are supplied with current from the battery 11 through the rheostat 12. The circuit arrangement and the relationship of these coils are such that the resultant magnetism of both coils can be varied continuously from a maximum in one direction to a maximum in the opposite direction by adjusting the rheostat 12. When not in use the battery circuit is broken by the switch 13. The generator 5 is provided with some means of revolving the armature 14 between the pole pieces, 15. This may be a hand operated crank 16 or any other suitable source of mechanical power. A constant speed clutch 17 is provided for keeping the speed of the armature approximately constant with varying speeds at the crank 16. The operation is as follows:

The field 4 is excited magnetically by the direct current flowing in the cable 1. The amount of magnetic flux is very nearly directly proportional to the amount of direct current flowing, the flux density of the iron being reduced to a point where the excitation curve is substantially straight; and the disturbing effects of magnetic hysteresis and varying reluctance of the iron being practically eliminated by the nonmagnetic gaps 9. The effects of residual magnetism in the iron or of powerful magnetic fields in the vicinity of the instrument can be neutralized by means of the neutralizing circuit 10, 11, 12 and 13. In using the neutralizing device, the procedure is to close the battery circuit at 13 and turn the crank before the field 4 has been clamped around the cable and then to adjust the variable resistance until the millivoltmeter 8 reads zero. Now if the relationships of the various parts are as shown in Fig. 1 and if the adjustments are properly made, rotation of the armature 14 will cause a current to flow in the measuring instrument 8. This current and consequently the indication given by the instrument will be very nearly proportional to the current flowing in the cable 1.

The armature 14 may be equipped with a two segment commutator 14' thereby giving a pulsating unidirectional current through the instrument 8. The armature current is then an alternating current and by proper design to give the armature a high reactance in comparison with the resistance of instrument 8 the speed of rotation will become relatively nonimportant in determining the indication of the instrument. This is due to the fact that the reactance of the armature increases with the speed as does also the induced voltage. Therefore the current through the instrument being nearly proportional to voltage divided by reactance will remain substantially constant. This is of advantage because substantial variations of speed will not cause great variations of current, although for more accurate measurement the speed regulation clutch is desirable. This is of the centrifugal governor type and operates to disconnect the driving mechanism from the armature when the speed tends to go above a certain definite value. The combined effect of the armature reactance and the constant speed clutch gives a substantially constant meter indication for any one value of cable line current regardless of crank speed variations beyond a certain speed.

Due to the presence of the nonmagnetic gaps 9 in the magnetic circuit 4, the indication of the instrument 8 will vary somewhat with the position of the cable 1 with respect to the center of the magnetic ring 4. This difficulty can be overcome by making the diameter of the ring 4 large in comparison with that of the cable and using nonmagnetic spacers within the ring to fix the position of the cable. These spacers are indicated diagrammatically at 4'. The presence of the nonmagnetic gaps also makes the device somewhat sensitive to the presence of strong magnetic fields external to the ring 4. This difficulty can be overcome by enclosing the device in a magnetic shield or case of soft iron. This should be made to enclose both the ring 4 and the generator 5 with a continuous magnetic circuit and must be separated from the instrument itself by a nonmagnetic gap. The use of such a shield is not necessary with an instrument designed for the measurement of large currents only.

Such a shield is indicated diagrammatically in section in Fig. 1ᵇ, the magnetic shield totally enclosing the generator 5 and its field magnet 4 being indicated at 33. The latter is of substantially larger dimensions than the instrument so as not to interfere with the functioning of the magnetic circuit thereof, spacing blocks 34 being diagrammatically indicated to maintain the desired separation. The casing or shield 33 should be capable of insertion around the cable similarly to the field circuit 4, and for this purpose the shield may be made in two parts and hinged at 35 so as to swing alone or simultaneously with the hinged portion of the field circuit.

The commutator segments of the generator 5 are preferably of a large diameter as compared to the width of brush surface, thereby to minimize the effect of changes in radial position with respect to the axis of the pole pieces of the generator. This has the further advantage that within certain ranges an increase of surface speed at the commutator tends to steady the contact resistance. The effect of varying contact resistance may be minimized by making the impedance of the total meter circuit high as compared to the contact resistance.

Several ranges of current measurement can be secured in a single instrument by the use of resistance units having different values of resistance, any one of these resistance units being connected in shunt to the instrument 8 as shown at 18.

I claim:

1. An apparatus for measuring unidirectional current in a cable comprising an electric generator having a field circuit adapted to be positioned to encircle the cable, said field circuit being of substantially greater diameter than the cable and having portions of its path of low reluctance and having smaller sections of its path of greater reluctance, a measuring instrument connected to the armature of the generator, said measuring instrument being calibrated to give indications substantially proportional to the flux set up in the field circuit by the unidirectional current and means for rotating the generator armature.

2. An apparatus of the character set forth in claim 1 in which the generator armature is provided with rectifying segments and brushes to give a unidirectional current to the measuring instrument.

3. An apparatus for measuring unidirectional current flowing in a cable transmission system including a unit which is readily portable and attachable about the cable whose current is to be measured and comprising a generator whose field circuit is readily adapted to be magnetically associated with the field set up by the unidirectional current in the cable, a measuring instrument connected to the armature of the generator, a variable speed driving source for said armature and regulating means between the driving means and the armature for maintaining the rotation of the armature at substantially constant speed.

4. An apparatus for measuring unidirectional current in a cable comprising an electric generator whose field circuit is adapted to be operatively associated with the magnetic field set up by the unidirectional current in the cable, a pair of exciting coils carried by the field circuit, means for supplying an exciting current to said fields in a manner to excite the field in either direction, a measuring instrument connected with the generator and means for driving the generator armature.

5. The combination of a magnetic path or circuit composed of sections of material of low reluctance separated by sections of material of high reluctance, means for opening and closing the magnetic circuit so as to surround a cable or conductor with said magnetic circuit, a revoluble armature adjacent to and forming a part of the magnetic circuit, means for revolving said armature, an indicating device connected to said armature, the whole being used to indicate or measure direct current flowing in the cable or conductor which the magnetic path surrounds.

6. The combination of a magnetic path or circuit of suitable reluctance, means for mechanically surrounding a cable or conductor carrying direct current with the magnetic path without breaking the continuity of the direct current circuit, a separate electric circuit adjacent to and in magnetic relation to the magnetic path, a source of direct current supply connected to the separate electric circuit for varying the current flowing in this circuit, a revoluble armature adjacent to and forming a part of the magnetic circuit, means for revolving said armature and an indicating device connected to said armature.

7. The combination of a magnetic path or circuit of suitable reluctance, means for opening and closing the magnetic circuit so as to surround a cable or conductor carrying direct current with said magnetic circuit, a revoluble armature adjacent to and in magnetic relation with said magnetic circuit, means for revolving said armature, means for keeping the speed of revolution of said armature substantially constant, and a measuring device connected to said armature, through brushes and a commutator, the whole being adapted to indicate or measure the direct current flowing in the cable or conductor.

8. The combination of a magnetic path or circuit composed of sections of material of low reluctance separated by sections of high reluctance, means for opening and closing the magnetic circuit so as to surround a cable or conductor with the magnetic circuit, a separate electric circuit adjacent to and in magnetic connection with the magnetic circuit, a source of direct current supply connected to said separate electric circuit, means for varying the current flowing in this circuit, a revoluble armature adjacent to and forming a part of the magnetic circuit, means for revolving said armature, and a measuring device connected to said armature, the whole being adapted to indicate or measure direct current flowing in the cable or conductor.

9. The combination of a magnetic path or circuit of low reluctance, means for mechanically surrounding a cable or conductor carrying direct current with the magnetic path without breaking the continuity of the direct current circuit, a separate electric circuit adjacent to and in magnetic connection with the magnetic path, a source of direct current supply connected to said separate electric circuit, means for varying the current flowing in this circuit, a revoluble armature adjacent to and forming a part of the magnetic circuit means for revolving said armature, means for keeping the speed of revolution of said armature constant, and a measuring device connected to said armature, the whole being adapted to indicate or measure direct current flowing in the cable or conductor.

10. The combination of a magnetic path or circuit composed of sections of material of low reluctance separated by sections of high reluctance, means for opening and closing the magnetic circuit so as to surround a cable or conductor with the magnetic circuit, a revoluble armature adjacent to and forming a part of the magnetic circuit, means for revolving said armature, means for keeping the speed of revolution of said armature constant, a measuring device connected to said armature, the whole being used to indicate or measure direct current flowing in the cable or conductor which the magnetic path surrounds.

11. The combination of a magnetic path or circuit composed of sections of material of low reluctance separated by sections of material of high reluctance, means for opening and closing the magnetic circuit so as to surround a cable or conductor with the magnetic circuit, a separate electric circuit adjacent to and in magnetic connection with the magnetic circuit, a source of direct current supply connected to said separate electric circuit, means for varying the current flowing in this circuit, a revoluble armature adjacent to and forming a part of the magnetic circuit, means for revolving said armature, means for keeping the speed of revolution of said armature constant, a magnetic shield adjacent to said magnetic circuit and armature, a measuring device connected to said armature, and a resistance unit connected in shunt to said measuring device, the whole being used to indicate or measure direct current flowing in the cable or conductor.

12. An apparatus for measuring unidirectional current in a cable transmission system comprising an electric generator having a field circuit adapted to be positioned to encircle a cable whose current is to be measured, said field circuit having portions of its path of low reluctance and having smaller sections of its path of greater reluctance, a measuring instrument connected to the armature of the generator, said measuring instrument being calibrated to give indications substantially proportional to the flux set up in the field circuit by the unidirectional current and means for rotating the generator armature.

13. An apparatus for measuring unidirectional current in a cable transmission system comprising an electric generator whose field circuit is adapted to be positioned about the cable, said field circuit having sections of low reluctance separated by sections of high reluctance, the armature of said generator being of high reactance and having a commutator for rectifying the armature current and an indicating instrument connected with said commutator through suitable brushes together with means for rotating the armature at high speed.

14. An apparatus for measuring unidirectional current in a cable system comprising an electric generator whose field magnetic circuit is adapted to be operatively associated with the magnetic field set up by the unidirectional current in a cable, an exciting coil carried by the field circuit, means for supplying an exciting current to said coil in a manner to excite the field circuit in either direction, a measuring instrument connected with the generator and means for operating the generator armature.

15. An apparatus for measuring unidirectional current in a cable transmission system comprising an electric generator having a field circuit adapted to be positioned to encircle the cable whose current is to be measured, said field circuit being of substantially larger diameter than said cable and having high reluctance gaps therein, a measuring instrument connected to the armature of the generator, said measuring instrument being calibrated to give indications substantially proportional to the flux set up in the field circuit by the unidirectional current and means for rotating the generator armature.

16. An apparatus of the character set forth in claim 12 enclosed within a magnetic shield separated therefrom.

17. An apparatus of the character set forth in claim 1 having an enclosing magnetic shield for the purpose set forth.

18. An apparatus for measuring unidirectional currents in cables of a transmission system comprising a direct current generator whose field is readily adapted to be operatively associated with a cable whose current is to be measured and be effectively excited by the unidirectional current flowing therein, a direct current measuring instrument connected with the armature of the generator, said armature being of comparatively high reactance and said instrument being of comparatively low resistance, and means for rotating said armature including a constant speed regulator.

19. An apparatus of the character set forth in claim 18 in which the impedance of the measuring instrument circuit including the generator armature is high compared to the contact resistance of the commutator brushes.

In testimony whereof, I have signed my name to this specification.

WILLIAM RALPH BULLARD.